(12) United States Patent
Okui

(10) Patent No.: US 6,594,758 B1
(45) Date of Patent: Jul. 15, 2003

(54) SYSTEM, METHOD, AND MEDIUM FOR BROADCASTING SERVICE CONTENTS

(75) Inventor: Tamio Okui, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/323,856

(22) Filed: Jun. 2, 1999

(30) Foreign Application Priority Data

Jun. 2, 1998 (JP) ............................................ 10-167812

(51) Int. Cl.[7] ................................................. G06F 1/24
(52) U.S. Cl. ....................... 713/163; 713/153; 713/168; 713/171
(58) Field of Search ................................. 713/150, 153, 713/162, 163, 168, 171

(56) References Cited

U.S. PATENT DOCUMENTS

| 4,866,770 A | * | 9/1989 | Seth-Smith et al. | ........ 348/461 |
| 5,440,541 A | * | 8/1995 | Iida et al. | ................... 370/352 |
| 5,574,505 A | * | 11/1996 | Lyons et al. | ................ 348/465 |
| 5,708,963 A | * | 1/1998 | Mobley et al. | ............ 455/12.1 |

FOREIGN PATENT DOCUMENTS

| JP | 07-202884 A | 8/1995 |
| JP | 8-293827 | 11/1996 |
| JP | 09-116592 A | 5/1997 |
| JP | 09-319673 A | 12/1997 |
| JP | 11-239125 A | 8/1999 |

OTHER PUBLICATIONS

Technical Report of IEICE; The Institute of Electronics, Information and Communication Engineers; (Apr. 1998).
Technical Report of IEICE; The Institute of Electronics, Information and Communication Engineers Apr. 23, 1998, vol. 98 No. 9; Kikai—Shinko—Kaikan Bldg., 5–8, Shibakoen 3 Chome, Minato–ku, Tokyo, 105–0011 Japan.

* cited by examiner

Primary Examiner—Thomas R. Peeso
(74) Attorney, Agent, or Firm—Foley & Lardner

(57) ABSTRACT

A Ca server 13 generates and encrypts a work key (Kw) and delivers the key to receiving terminals. The CA server further updates scramble key (Ks) at a predetermined interval and delivers the key to the terminals. A contents server 14 encrypts service contents using the Kw and the Ks to deliver the contents toward an IP address for the group. A delivering router 15 receives the contents and delivers the content to the receiving terminals based on the IP address. The receiving terminals, when receives the encrypted contents, decode the contents using the Kw and the Ks and replace the IP address with its own IP address.

13 Claims, 9 Drawing Sheets

FIG. 3

| RECEIVING TERMINAL NUMBER | MASTER KEY |
|---|---|
| $11_1$ | "Km1" |
| $11_2$ | "Km2" |
| $11_3$ | "Km3" |
| $11_4$ | "Km4" |
| $11_5$ | "Km5" |
| $11_6$ | "Km6" |

| PAY DELIVERY SERVICE | RECEIVING TERMINAL NUMBER (s) |
|---|---|
| A | $11_1, 11_2, 11_3$ |
| B | $11_1, 11_2, 11_4, 11_5$ |
| C | $11_3, 11_4$ |

| PAY DELIVERY SERVICE | WORK KEY |
|---|---|
| A | KwA |
| B | KwB |
| C | KwC |

(31, 32, 22)

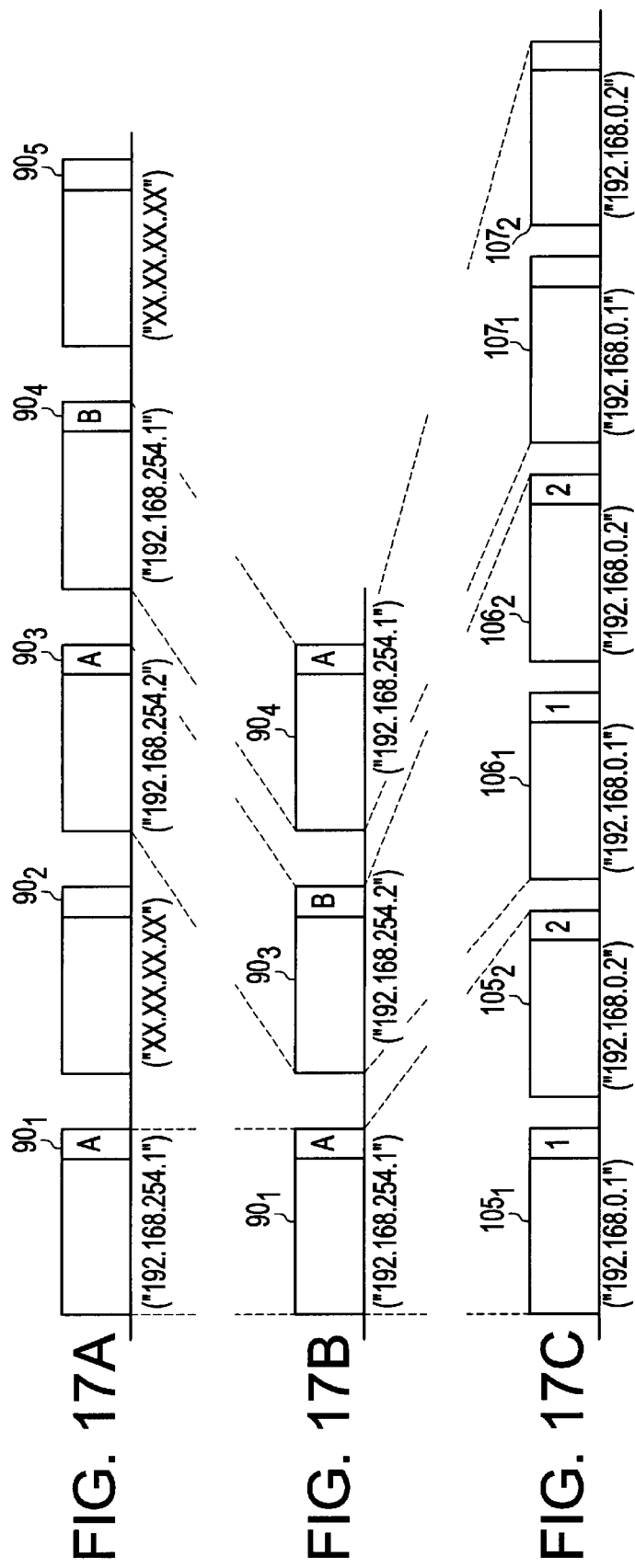

SYSTEM, METHOD, AND MEDIUM FOR BROADCASTING SERVICE CONTENTS

BACKGROUND OF THE INVENTION

1. Field of the Invention

This invention relates to a broadcasting system which provides one-to-many communication service and, in particular, to a broadcasting system which is capable of broadcasting common contents concerned with push type service to a plurality of subscriber's terminals.

2. Description of the Related Art

In the past, performance of processing in a computer and technology of network communication have been remarkably improved. As a result, recent attention has been focused on multimedia technology which employs bi-directional media and a combination of sounds, characters, and images. On-demand type service is one of the services which are provided by the multimedia technology.

In a network system which provides on-demand type service, terminal devices and a center device are connected to a ground network, such as a cable television network. When a user sends a receiving request or a retrieving request from one of the terminal devices to the control device, contents which include service information in response to the user's request are transmitted from the center device to the terminal device of the user by accessing databases in the center device. Thereby, the user may obtain the contents in reply to the user's request.

The internet has widely and quickly grown up and has built a communication infrastructure which is not less than a public telephone network, by repeating mutual connection of Local Area Network (hereinafter, referred to as LAN). The above described on-demand type service may easily provide with more sophisticated service at a low cost by using the Internet. In addition to the on-demand type service, push type service which can broadcast common contents to a plurality of subscriber's terminals has also been considered and started with interest.

The push type service is more suitable for achieving efficiency of network communication and saving communication cost when the service employs a satellite communication network rather than employs a ground communication network since the service provides broadcasting. However, to commercialize the value added service which provides satellite television broadcasting or satellite data communication using the broadcasting, only users subscribing to the service can enjoy selectively the service.

In the broadcasting system which uses the satellite communication network, a temporary key is used for transmitting broadcasting information to users, and a unique user key is used for each receiving terminal. The temporary key is updated periodically to maintain confidentiality of the broadcasting information. The user key is used when the temporary key is initialized in starting up the receiving terminal of the temporary key is modified. Therefore, an information sending device may broadcast the encrypted information to each receiving device via a satellite communication network by selecting any keys among these keys. Each of the receiving terminals may receive the information and accumulate the information by decoding the encrypted information using these keys. According to the above techniques, only users who are subscribing to the service may receive the information and a probability that an imprudent or an illegal person receives the information may be considerably reduced.

A technology about such a broadcasting system which attaches importance to confidentiality is also disclosed in Japanese Laid-Open Publication No. Hei 8-293827 (namely, 293827/1996) titled "A Satellite Information Broadcasting System and A Receiving Device Used in The System".

The above-mentioned technology used in the satellite Internet system via a satellite communication network is a technology in which a function of a IP (Internet Protocol: hereinafter, referred to as IP) router, which is widely used in a ground network, is applied to the satellite communication network. However, since protocols, such as TCP/IP (Transmission Control Protocol/Internet Protocol) and UDP/IP (User Datagram Protocol/Internet Protocol), have been developed on the basis of a point-to-point communication system, it is difficult to provide a broadcasting communication system which belongs to a point-to-multi-point communication system, as long as the protocols have been used.

Namely, since in the point-to-point communication system, a message is transmitted between a source port and a destination port each of which is assigned a unique IP address, the message should be copied, for example, in interchange nodes of a network between the interchange nodes along with a transmission path and be transmitted to a plurality of interchange nodes and, as a result, efficiency of transmission is degraded. Also, a work load of each of the interchange nodes is increased according to the above processes. Furthermore, if there are different destination nodes, the point-to-multi-point communication system which has been in a network can not be efficiently used since there are a plurality of nodes to which the interchange nodes should transmit the message.

Further, when a satellite communication network is used as infrastructure of a point-to-point communication system, there is a problem that the communication system can not provide a merit in an area where a land-based network is fully popularized, as a result, a running cost of the communication system becomes high.

Also, in a broadcasting system as disclosed in Japanese Laid-Open Publication No. Hei 8-293827, it is possible to maintain confidentiality of broadcasting information, but it is too expensive to install the system. If possible, it is desirable to divert an existing land-based LAN resources which has been used to communicate.

SUMMARY OF THE INVENTION

Therefore, it is an object of the invention to provide a broadcasting system which is capable of efficiently broadcasting by using present network protocols and outstanding confidentiality.

According to a first aspect of the invention, there is provided a broadcasting system which includes a source sending unit and a plurality of receiving terminals each of which is connected to the source sending unit via a network and which is operable to broadcast service contents from the source sending unit to the plurality of receiving terminals. Wherein, the source sending unit comprises a data packet generator which generates a data packet including a part of the service contents and a group address assigned to a predetermined group of the receiving terminals as a destination address, and a service contents delivering unit which delivers the data packet to the predetermined group of the receiving terminals based on the group address.

According to a second aspect of the invention, there is provided a broadcasting system which includes a source sending unit and a plurality of terminals each of which is connected to the source sending unit via a network and which broadcasts service contents from the source sending unit to the plurality of receiving terminals. Wherein, the source sending unit comprises a key supplying unit which generates a work key for each service of the service contents and sends the work key to the receiving terminals, a contents encrypting unit which encrypts the service contents by using the work key, and a contents delivering unit which delivers the encrypted service contents to the receiving terminals. Furthermore, each of the receiving terminals comprises a key receiving unit which receives the work key from the source sending unit, a contents receiving unit which receives the encrypted service contents from the source sending unit, and a contents decoding unit which decodes the received and encrytped service contents into decoded service contents.

According to a third aspect of the invention, there is provided a method of broadcasting service contents from a source sending unit to a plurality of receiving terminals each of which is connected to the source sending unit via a network. Wherein, the method comprises the steps of preparing the source sending unit, generating a data packet including a part of the service contents and a group address assigned to a predetermined group of the receiving terminals as a destination address, and broadcasting the data packet to the predetermined group of the receiving terminals on the basis of the group address.

According to a fourth aspect of the invention, there is provided a method of broadcasting service contents from a source sending unit to a plurality of receiving terminals each of which is connected to the source sending unit via a network. Wherein, the method comprises the steps of preparing the source sending unit, generating a work key for each service of the service contents and sending the work key to the receiving terminals, encrypting the service contents by using the work key, and delivering the encrypted service contents to the receiving terminals. Further, at each of the receiving terminals, the method comprises the steps of receiving the work key from the source sending unit, receiving the encrypted service contents from the source sending unit, and decoding the received and encrypted service contents.

BRIEF DESCRIPTION OF THE DRAWINGS

FIG. 3 schematically shows contents in a Km table 19 according to the first embodiment of the invention;

FIG. 4 schematically shows contents in a grouping information unit 20 according to the first embodiment of the invention;

FIG. 5 schematically shows contents in a Kw table 22 according to the first embodiment of the invention;

FIGS. 17(a) through 17(c) show a diagram illustrating a flow of IP datagrams according to the second embodiment of the invention.

DESCRIPTION OF THE PREFERRED EMBODIMENT

A First Embodiment of the Invention

Figure 1:
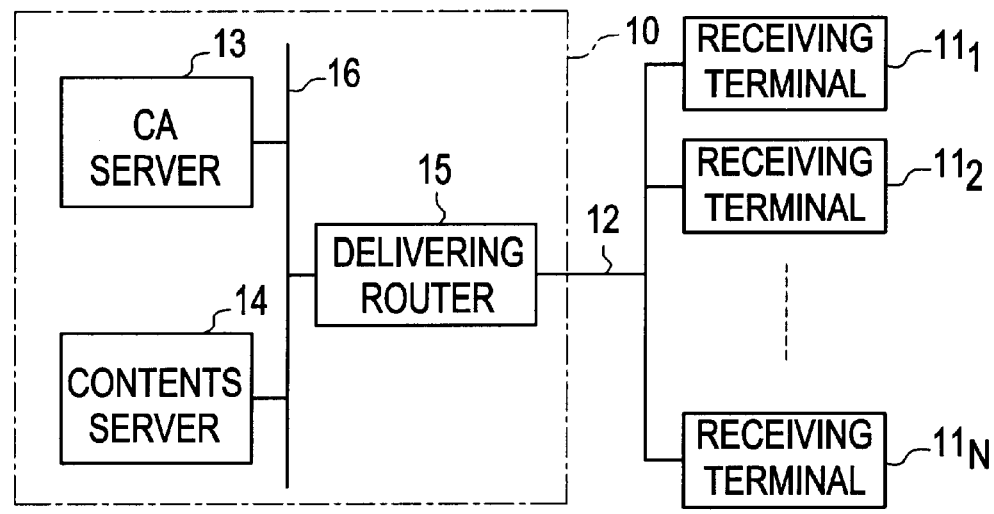
FIG. 1 shows a block diagram of a broadcasting system according to a first embodiment of the invention.

A broadcasting system as shown in FIG. 1 includes a broadcasting unit 10, receiving terminals $11_1, 11_2, \ldots, 11_N$, and a communication path 12. The broadcasting unit 10 generates, accumulates, and broadcasts contents which includes service information. The receiving terminals $11_1$ to $11_N$ receive the contents from the broadcasting unit 10. The communication path 12 connects the broadcasting unit 10 and each of the receiving terminals $11_1$ to $11_N$.

Also, the broadcasting unit 10 includes a CA (Conditional Access) server 13 which manages delivery destinations of contents, a contents server 14 which generates and accumulates the contents to be delivered and delivers the contents to the delivery destinations managed by the CA server 13, and a delivering router 15 which delivers the contents toward the communication path 12. The CA server 13, the contents server 14, and the delivering router 15 are connected each other via a Lan 16. Further, among the CA server 13, the contents server 14, and the delivering router 15, data packets which are accommodated for IP datagrams are used as unit of receiving/sending data (information). As a result, the IP datagrams which are supplied to the delivering router 15 from the LAN 16 is then delivered to the receiving terminals $11_1$ to $11_N$ through the communication path 12. Therefore, the service information is delivered by identifying an IP header in the IP datagrams.

The CA server 13 which manages delivery destinations of contents allows only predetermined receiving terminals to selectively receive the contents from the contents server 14 by delivering to the predetermined receiving terminals a key to encrypt the contents.

For example, it is assumed that three species of pay delivery services, pay delivery service A, pay delivery service B, and pay delivery service C are available to six species of receiving terminals, a first receiving terminal 111 to a sixth receiving terminal 116. Each of the receiving terminals may receive any of the pay delivery services by entering into contracts with providers of pay delivery services which users of the receiving terminals want to receive. For example, it is assumed that the contracts for the pay delivery services are made as follows.

first receiving terminal 111: pay delivery services A, B, and C ... (1)

second receiving terminal 112: pay delivery services A and B ... (2)

third receiving terminal 113: pay delivery services A and C ... (3)

fourth receiving terminal 114: pay delivery services B and C ... (4)

fifth receiving terminal 115: pay delivery services B ... (5)

sixth receiving terminal 116: no contract for the service ... (6)

Therefore, a broadcasting group of the pay delivery service A includes the first to the third receiving terminals 111 to 113, a broadcasting group of the pay delivery service B includes the first, the second, the fourth, and the fifth receiving terminals 111, 112, 114, and 115, and a broadcasting group of the pay delivery service C includes the first, the third, and the fourth receiving terminals 111, 113, and 114. According to the definition, contents of each of the pay delivery services A to C are delivered toward the broadcasting group, in other words, toward an IP address corresponding to the broadcasting group.

Figure 2:
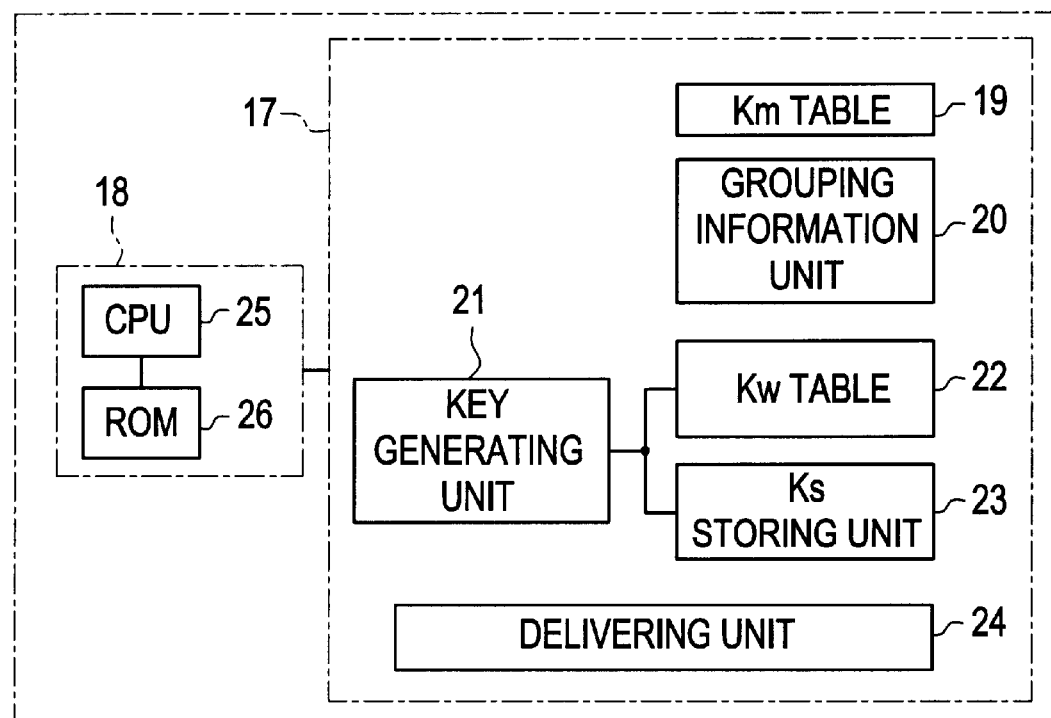
FIG. 2 shows a configuration of main parts of a CA server 13 according to the first embodiment of the invention.

The CA server 13 shown in FIG. 2 includes a destination managing unit 17 which manages delivery destinations of contents and a CA server control unit 18 which controls the destination managing unit 17. The destination managing unit 17 includes a Km table 19 which stores master keys (Km) each of which encrypts or decodes delivery information and which is uniquely stored in one of receiving terminals 111–116, a grouping information unit 20 which includes description information representing which receiving terminal belongs to which of broadcasting groups, a key generating unit 21 which generates scramble keys (Ks) and work keys (Kw) each of which may encrypt or decode the delivery information and which is uniquely stored one of the broadcasting groups, a Kw table 22 which stores the work keys (Kw), a Ks storing unit 23 which stores the scramble keys (Ks), and a delivering unit 24 which delivers thus generated keys. Also, the CA server control unit 18 which controls the above-mentioned destination managing unit 17 includes a Central Processing Unit 25 (hereinafter, abbreviated to CPU) and a Read Only Memory 26 (hereinafter, abbreviated to ROM). The CA server 18 is controlled according to a destination management control procedure which is stored in the ROM 26.

The Km table 19 as shown in FIG. 3 serves to store the master key 28 (Km) for each receiving terminal number 27 and the master keys 28 are different from each other. Therefore in this embodiment of the invention, the first–sixth receiving terminals $11_1$, $11_2$, $11_3$, $11_4$, $11_5$, and $11_6$ are individually assigned to the master keys Km 1, Km 2, Km 3, Km 4, Km 5, and Km 6, respectively.

The grouping information unit 20 as shown in FIG. 4 stores the groups of receiving terminals (broadcasting groups) for each pay delivery service, Thereby, the receiving terminals are provided with pay delivery service according to each of the description of the pay delivery services 29. In the embodiment of the invention, according to the above contracts (1) to (6), the first receiving terminal $11_1$, the second receiving terminal $11_2$, and the third receiving terminal $11_3$ belong to the broadcasting group of the pay delivery service A. Similarly, the first receiving terminal $11_1$, the second receiving terminal $11_2$, the fourth receiving terminal $11_4$, and fifth receiving terminal $11_5$ belong to the broadcasting group of the pay delivery service B. Furthermore, the third receiving terminal $11_3$ and the fourth receiving terminal $11_4$ belong to the broadcasting group of the pay delivery service C.

The key generating unit 21 generates a work key (Kw) for each pay delivery service and stores the work key into the Kw table 22. Further, the key generating unit 21 may generate a scramble key which is capable of encrypting a data packet at a predetermined interval and deliver the scramble key to the corresponding receiving terminal through the delivering unit 24 after the scramble key is stored into the Ks storing unit 23. Since the scramble key is updated at any intervals, the confidentiality of service information is maintained even after the service information is delivered via the communication path 12 through the delivering router 15, and the possibility of wire tapping is reduced.

The Kw table 22 as shown in FIG. 5 services to store the work keys 32 (Kw) which are different from each other and which are generated for each pay delivery service 31 by the key generating unit 21. In the embodiment of the invention, the work keys Kw A, Kw B, and Kw C are stored in the Kw table 22 and the Kw A, Kw B, and Kw C correspond to pay delivery services A, B, and C, respectively.

The delivering unit 24 may deliver the master keys (Km) which are different from each other and are assigned to one of the receiving terminals, and the work keys (Kw) or the scramble keys (Ks) which are different from each other and are assigned to one of the pay delivery services via the contents server 14 or the delivering router is to the receiving terminals $11_1$ to $11_N$.

Thus configured CA server 13 may manage destinations by encrypting contents which are delivered from the contents server 14 and delivering the necessary keys for encrypting or decoding the contents so that the receiving terminals which enter into contracts for receiving of contents may receives the contents. Delivering of the necessary keys is processed by the CPU 25 according to a procedure which is stored into the ROM 26 in the CA server control unit 18.

Figure 6:
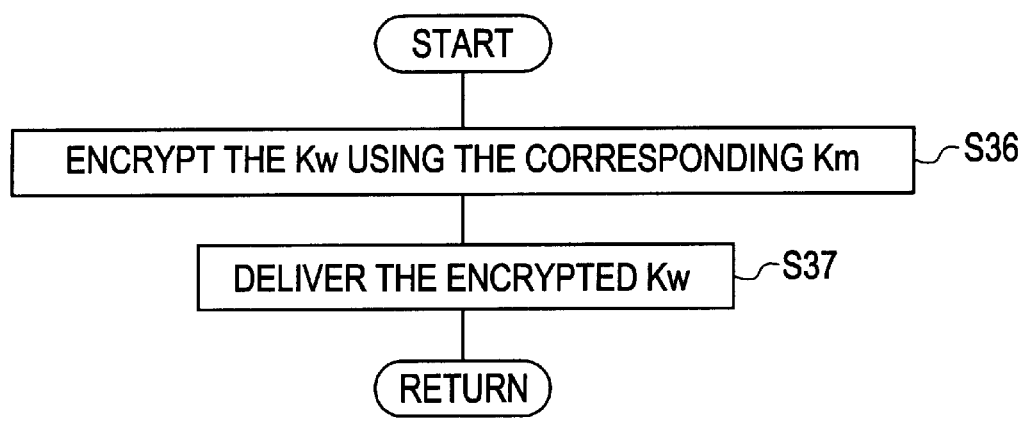
FIG. 6 shows a flowchart illustrating procedure of processes of the CA server 13 according to the first embodiment of the invention.

FIG. 6 shows a flowchart of the procedure stored in the ROM 26. The CA server 13 start the procedure as required, for example, when a receiving terminal is powered on. When the CA server 13 starts the procedure, a key (Kw), which is common to a pay delivery service for decoding contents of the service, is delivered to only the receiving terminals which are entering into contract for receiving of the pay delivery service. This common key (Kw) should also be encrypted previously. Namely, the work key (Km), which is uniquely assigned to a pay delivery service, is encrypted using a master key (Km) which is uniquely assigned to the receiving terminal, based on information stored in the Km table 19, the grouping table 20, and the Kw table 22 (step S36). Then, the work keys (Kw) each of which is encrypted for each receiving terminal are delivered to the corresponding receiving terminals through the delivering unit 24 (step 37).

In the embodiment of the invention, the work keys Kw A and Kw B are encrypted using the master key Km1 and delivered to the first receiving terminal $11_1$. Further, the work keys Kw A and Kw B are encrypted using the master key Km2 and delivered to the second receiving terminal $11_2$. Still further, the work keys Kw A and Kw C are encrypted using the master key Km3 and delivered to the third receiving terminal $11_3$. Still further, the work keys Kw B and Kw C are encrypted using the master key Km4 and delivered to the fourth receiving terminal $11_4$. Lastly, the work key Kw B is encrypted using the master key Km5 and delivered to the fifth receiving terminal $11_5$.

Next, description will be made about the contents server 14.

Figure 7:
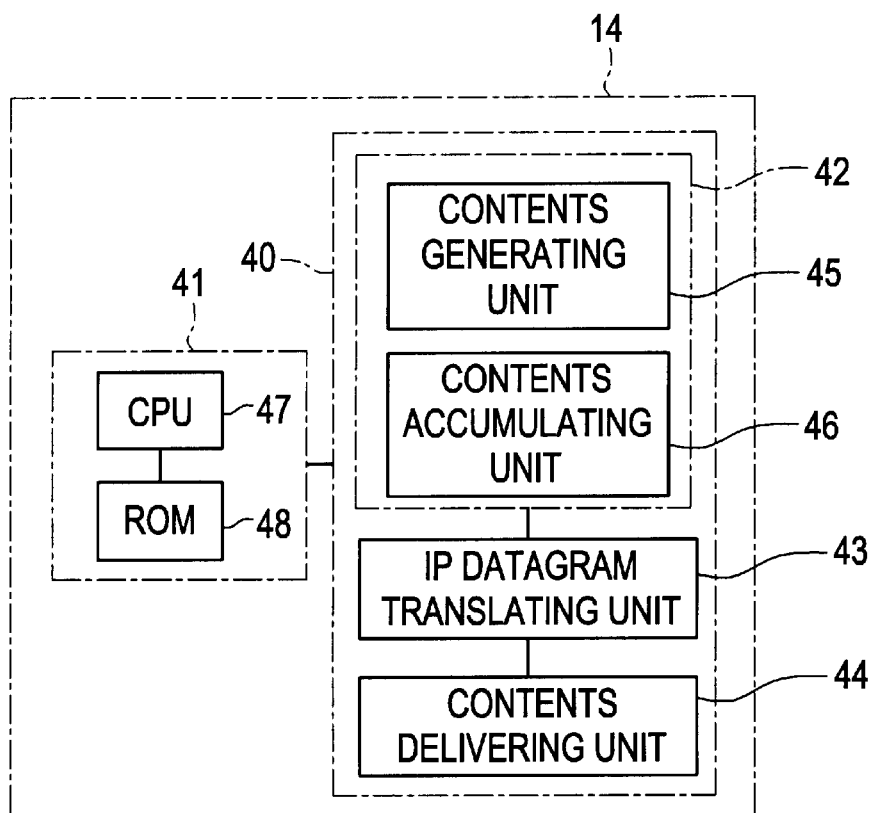
FIG. 7 shows a configuration of main parts of a contents server 14 according to the first embodiment of the invention.

In FIG. 7, the contents server 14 is shown in more detail. The contents server 14 includes a contents processing unit 40 which executes delivering process of service contents of the pay delivery service and a contents server control unit 41 which controls the contents processing unit 40. The contents processing units 40 includes a contents supplying unit 42 which supplies the service contents, an IP datagram translating unit 43, and a contents delivering unit 44. Further, the contents supplying unit 42 includes a contents generating unit 45 which generates the service contents and a contents accumulating unit 46 which accumulates the service contents generated by the contents generating unit 45. The service contents thus supplied from the contents supplying unit 42 are entered into the IP datagrams translating unit 43, and the contents are supplied from the contents delivering unit 44 to the LAN 16 (the corresponding broadcasting groups) as IP datagrams.

Figure 8:
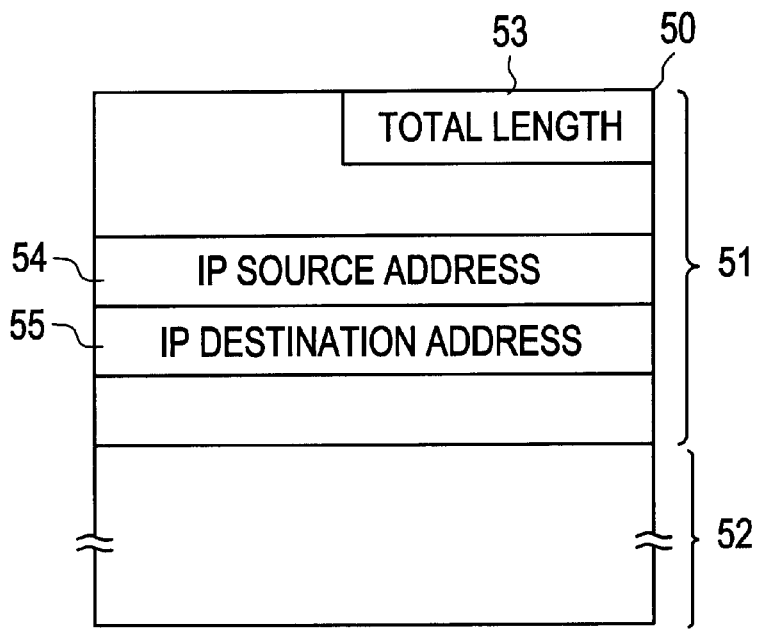
FIG. 8 schematically shows file format of the contents server 14 according to the first embodiment of the invention.
Figure 9:
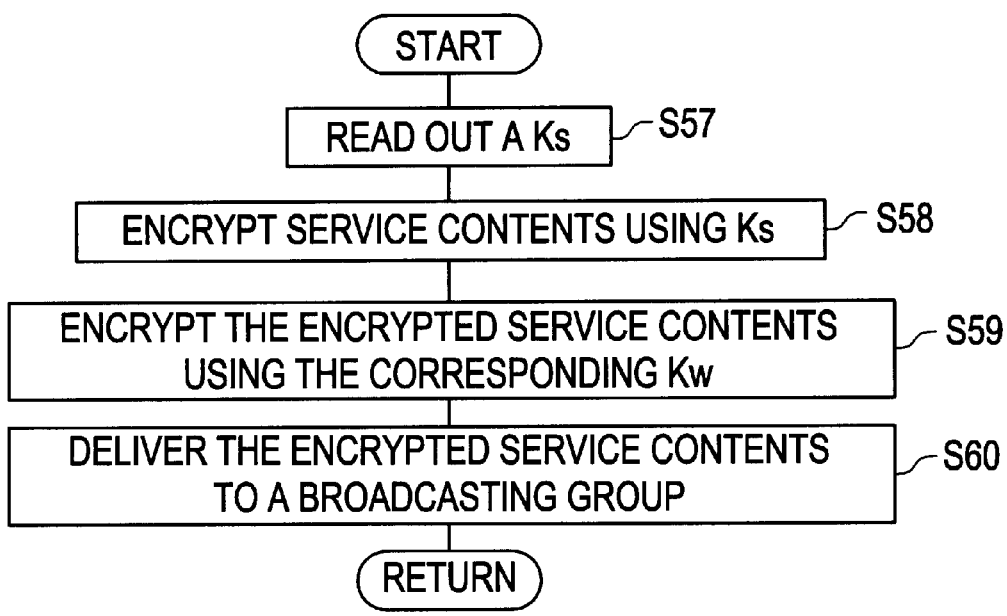
FIG. 9 shows a flowchart illustrating procedure of processes of the contents server 14 according to the first embodiment of the invention.

IP datagrams 50 as shown in FIG. 8 includes two fields, an IP header part 51 and an IP data part 52. The IP header part 51 further includes some fields, for example, a total length 53 which represents total length of the IP datagrams in byte, an IP source address 54, and an IP destination address 55. Therefore, the service contents which are supplied from the contents supplying unit 42 are delivered from the contents delivering unit 44 after an IP address which is assigned to a source is set to the IP source address 54 and an IP address which is assigned to the corresponding broadcasting group is set to the IP destination address 55 and after the service contents are divided and assembled into the IP data part 52. The IP address which is assigned to the corresponding broadcasting group may be anycast address or multicast address in IPv6, the contents having such the address in the IP destination address are deliver to an group of the receiving terminals (point-to-multipoint communication).

The contents server control unit 41 includes a CPU 47 and a ROM 48, and is controlled according to a delivery control procedure which is stored in the ROM 48.

In FIG. 8, a flowchart of the delivery control procedure which is stored in a ROM 47 is shown. The contents server 14 may starts the procedure according to a trigger such as a schedule, or be executing the procedure all day such as TV programs. When the contents server 14 starts the procedure, the contents server 14 reads out a scramble key (Ks) (step S57) which has been stored in a Ks storing unit (not shown) after receiving the Ks, which is generated by the key generating unit 21 shown in FIG. 2 at a predetermined interval, from the CA server 13. Then, the contents server 14 encrypts service contents to be delivered using the Ks (step S58) and further, encrypts the encrypted contents using the Kw which is uniquely assigned to the corresponding pay delivery service (step S59). An IP address of the broadcasting group for the pay delivery service is added as the IP destination address to the contents thus encrypted using Ks and Kw. Then they are delivered from the contents delivering unit 44 to the broadcasting group (step S60). The contents are encrypted using the Ks and Kw so that it is more difficult to decode the encrypted contents at the other receiving terminals and frequently updating of the Kw is avoided.

Next, description will be made about the delivering router 15 which delivers such a service contents which is delivered by the contents server 14 to the broadcasting group.

Figure 10:
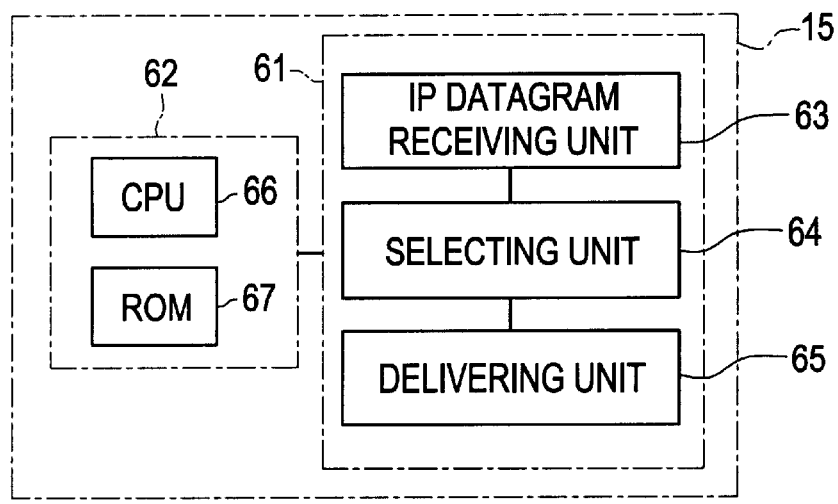
FIG. 10 shows a configuration of main parts of a delivering router 15 according to the first embodiment of the invention.

The delivering router 15 shown in FIG. 10 includes a delivery processing unit 61 and a delivering router control unit 62. The delivery processing unit 61 includes an IP datagram receiving unit 63 which receives IP datagrams which are delivered from the CA server 13 or the contents server 14 to the broadcasting group, a selecting unit 64, and a delivering unit 65. The delivering router 15 selectively delivers the IP datagrams which are having an IP address of the receiving terminal (including the keys from the CA server 13) or an IP address of the broadcasting address (including the service contents from the contents server 14) from the delivering unit 65 via the communication path 12 to the broadcasting group. The delivering router control unit 62 includes a CPU 66 and a ROM 67 and is controlled according to a delivering router control procedure which is stored in the ROM 67.

Figure 11:
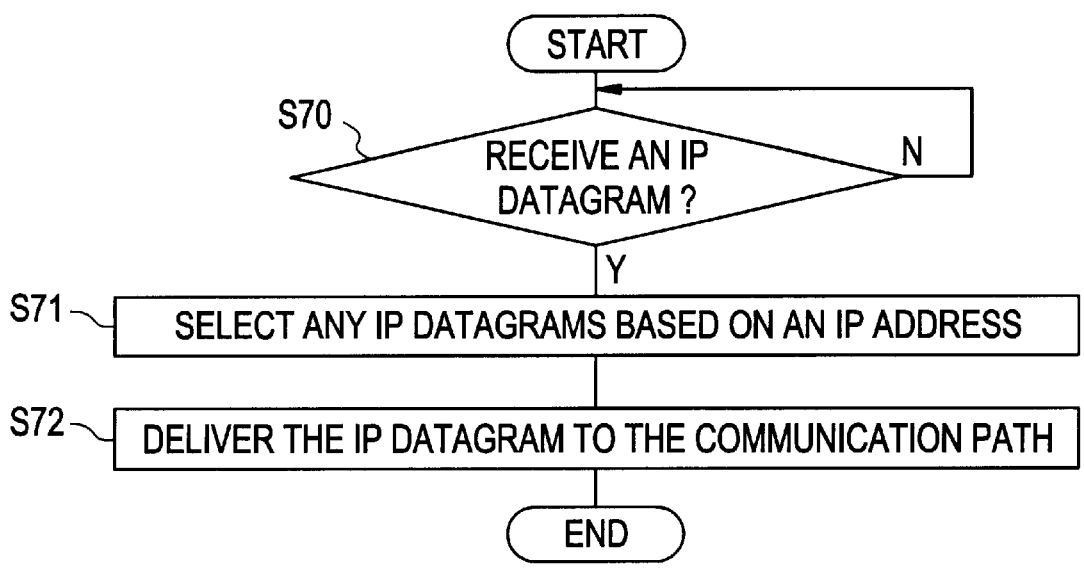
FIG. 11 shows a flowchart illustrating procedure of processes of the delivering router 15 according to the first embodiment of the invention.

FIG. 11 schematically shows a flowchart of the control procedure. When the delivering router 15 receives the IP datagram from the CA server 13 or the contents server 14 (step S70: Y), the delivering router 15 refers to the destination address of the IP datagram which having a data format shown in FIG. 8 and selects any IP datagrams having the IP address of the receiving terminal or the IP address of the broadcasting address (step S71). Thus selected IP datagrams are then supplied to the communication path 12, as a result, they are delivered to the receiving terminals in the IP destination address or the receiving terminals which are included in the broadcast group (step S72).

Next, description will be made about a receiving terminal which receives the IP datagrams delivered from the delivering router 15. Also, hereinafter, description will be made about the receiving terminal $11_1$, but description about the other receiving terminals $11_2$–$11_6$ are omitted since the configurations of the receiving terminals $11_2$–$11_6$ are similar to the configuration of the receiving terminal $11_1$.

Figure 12:
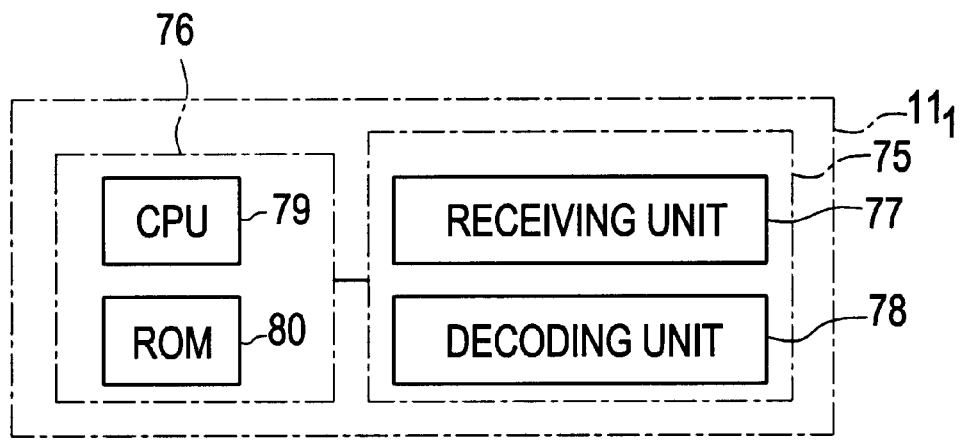
FIG. 12 shows a configuration of main parts of a receiving terminal $11_1$ according to the first embodiment of the invention.

The receiving terminal $11_1$ as shown in FIG. 12 includes a receive processing unit 75 and a terminal control unit 76. The receive processing unit 75 further includes a receiving unit 77 and a decoding unit 78. IP datagrams, which are delivered by the delivering router 15 via the communication path 12, are received by the receiving unit 77. Then, the receiving unit 77 determines whether or not the receiving terminal is included in the broadcasting group in the IP destination address of the IP datagrams. If the receiving terminal is included, then the decoding unit 78 decodes the IP datagrams as follows. The decoding unit 78 receives the scramble key (Ks), which are updated by the key generating unit 21 in the CA server 13 at a predetermined interval, and stores the scramble key into the Ks storing unit (not shown). Also, the decoding unit 78 receives the encrypted work key (Kw), which are encrypted by the CA server 13 using master key (Km) which is uniquely assigned to the receiving terminal, decodes the encrypted work key using the km of the receiving terminal to obtain decoded work key which is assigned to a pay delivery service. Then, the decoding unit 78 decodes the IP datagrams in sequence using the Kw and the Ks, replaces destination addresses in IP header parts of the IP datagrams with an IP address of the receiving terminals $11_1$, and processes the IP datagrams using an internal network processing module. The terminal control unit 76 allows to control such receiving of the IP datagrams at the receiving terminal. The terminal control unit 76 includes a CPU 79 and a ROM 80, and is controlled according to a terminal control procedure which is stored in the ROM 80.

Figure 13:
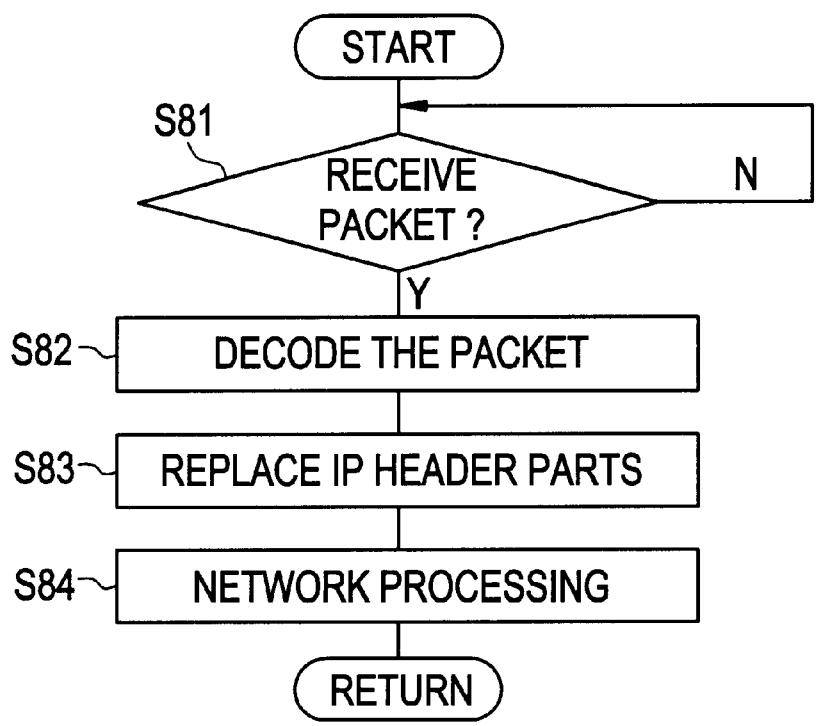
FIG. 13 shows a flowchart illustrating procedure of processes of the receiving terminal $11_1$ according to the first embodiment of the invention.

FIG. 13 schematically shows a flowchart of the control procedure which is stored in the ROM 80. When the receiving terminal $11_1$ receives the IP datagrams from the delivering router 15 (step S81: Y), the receiving terminal $11_1$ determines whether or not the receiving terminal is included in the broadcasting group in the IP destination address of the IP datagrams. If the receiving terminal is included, the receiving terminal $11_1$ decodes the receives information in the IP datagrams using the work key (Kw) which is uniquely assigned to the received pay delivery service, and then decodes the decoded information using the scramble key (Ks) to obtain service contents (step S82). It is more difficult to decode the decoded information at the other receiving terminals since the scramble key which is to be used to decode the decoded information is updated at a predetermined interval. Next, the receiving terminal $11_1$ replaces destination addresses in IP header parts of the IP datagrams with an IP address of the receiving terminal $11_1$ (step 83), and processes the IP datagrams using an internal network processing module.

As described above, an IP datagram is used as a unit of broadcasting information to be delivered in the broadcasting system, and destination of the information may be controlled by replacing the IP header parts of the IP datagrams. Next, more detail description will be made about a flow of IP datagrams in the broadcasting system as described above.

In the broadcasting system, a data packet, that is, an IP datagram is used as a unit of broadcasting information. Therefore, the broadcasting group address of pay delivery services should be specified before service contents are delivered. In this case, it is assumed that the IP addresses are specified as follows.

pay delivery service A: 192.168.254.1 ... (7)
pay delivery service B: 192.168.254.2 ... (8)
pay delivery service C: 192.168.254.3 ... (9)

Also, it is assumed that an IP address is assigned to each receiving terminal as follows.

first receiving terminal $11_1$: 192.168.0.1 ... (10)
second receiving terminal $11_2$: 192.168.0.2 ... (11)
third receiving terminal $11_3$: 192.168.0.3 ... (12)
fourth receiving terminal $11_4$: 192.168.1.1 ... (13)
fifth receiving terminal $11_5$: 192.168.1.2 ... (14)
sixth receiving terminal $11_6$: 192.168.2.1 ... (15)

Figure 14:
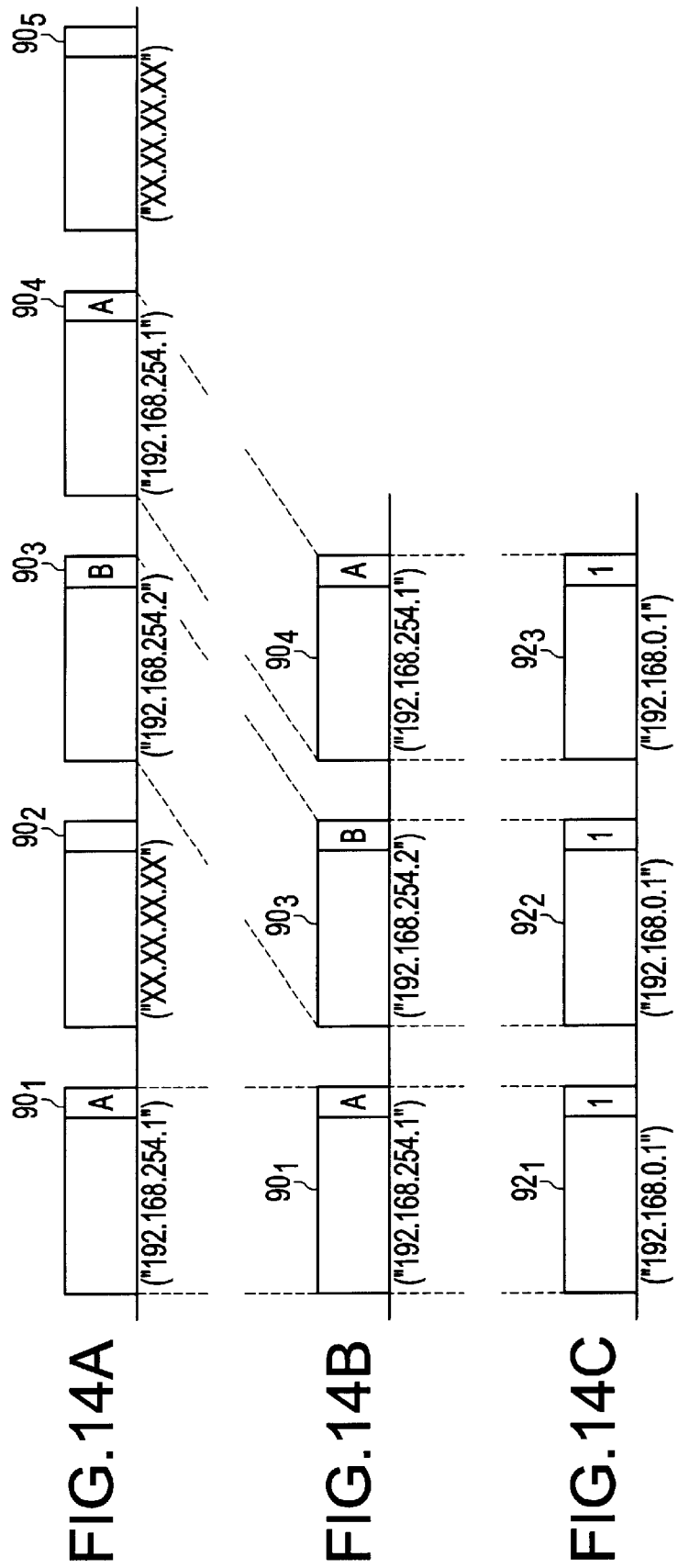
FIGS. 14(a) through 14(c) show a diagram illustrating a flow of IP datagrams according to the first embodiment of the invention.

FIGS. 14(a) through 14(c) show a flow of IP datagrams in the broadcasting system in which the IP addresses are specified as the above. FIG. 14(a) schematically shows a flow of IP datagrams on the LAN 16 in the broadcasting unit 10 shown in FIG. 1. As shown in FIG. 14(a), it is assumed that there are IP datagrams of the pay delivery service A $90_1$ and $90_4$, an IP datagram of the pay delivery service B $90_3$, and the other IP datagrams which are irrelevant to delivering of service contents $90_2$ and $90_5$. IP datagrams having the broadcasting group address or an IP address of each receiving terminal are selected at the delivering router 15 as shown in FIG. 11 from such IP datagrams on the LAN 16. Therefore, as shown in FIG. 14(b), the IP datagrams $90_2$ and $90_D$ are omitted, and IP datagrams $90_1$, $90_3$, and $90_4$ are delivered to the broadcasting group address via the communication path 12 as information to be delivered. Since the first receiving terminal $11_1$ enters into a contract of receiving of the pay delivery services A and B as shown in the above description (1), namely, the IP address of the receiving terminal $11_1$ is included in the broadcasting group of the pay delivery services A and B, IP datagrams $90_1$, $90_3$, and $90_4$ decoded, and the IP destination addresses are replaced with an IP address of the receiving terminal $11_1$ to generate IP datagrams $92_1$, $92_2$, and $92_3$ as shown in FIG. 14(c). Then, the receiving terminal $11_1$ processes the IP datagrams using an internal network processing module.

Figure 15:
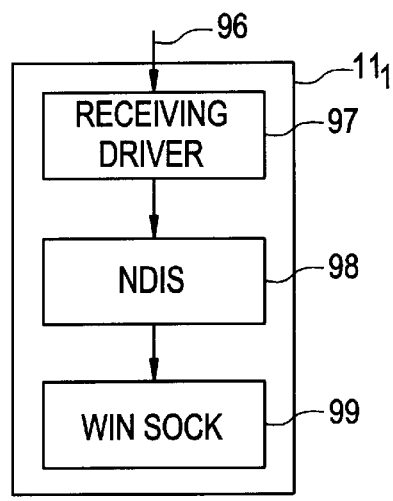
FIG. 15 schematically shows functions of internal network processing module according to the first embodiment of the invention.

FIG. 15 schematically shows a block diagram of the internal network processing module which processes information which is received at the first receiving terminal $11_1$.

A plurality of IP datagrams 96 which are delivered via the communication path 12 are firstly entered into a receiving driver 97. Then, the IP datagrams 96 are entered into Winsock (Windows socket) 99 via Network Driver Interface Specification (NDIS) 98 and used by any applications.

As described above, in the broadcasting system according to the first embodiment of the invention, the CA server 13 generates work keys each of which is uniquely assigned to a broadcasting group, encrypts the keys for each receiving terminal, and delivers the encrypted keys to the corresponding receiving terminal. Further, the CA server 13 updates scramble keys (Ks) at a predetermined interval and delivers the updated scramble keys to the corresponding receiving terminal. The contents server 14 encrypts IP datagrams using the Ks, encrypts the encrypted IP datagrams using the Kw again, and delivers the encrypted IP datagrams to an IP address of the broadcasting group. The delivering router 15 determines whether or not received IP datagrams are to be delivered to the communication path 12 based on IP addresses of the IP datagrams. The IP datagrams which are determined to be delivered are delivered to the receiving terminals and each of the receiving terminals receive the IP diagrams. When a receiving terminal receives the IP datagrams, the receiving terminal decodes the IP datagrams using the work key (Kw), and further decodes the decoded IP datagrams using the scramble key (Ks) to obtain information which is delivered. Here, the receiving terminal receives the work key (Kw) from the CA server 13 and decodes using the master key (Km) to generate a new work key (Kw) before the IP datagrams are received. The receiving terminal thus may selectively receive service contents which are encrypted in a unit of a data packet, (here, an IP datagram) while making use of resources of existing LAN.

A Second Embodiment of the Invention

The broadcasting system according to the first embodiment of the invention directly supplies service contents from the communication path 12 to the receiving terminals. However, in a system according to the second embodiment of the invention, a receiving router is newly added and the receiving router may supply delivering contents to a local network of receiving side.

Figure 16:
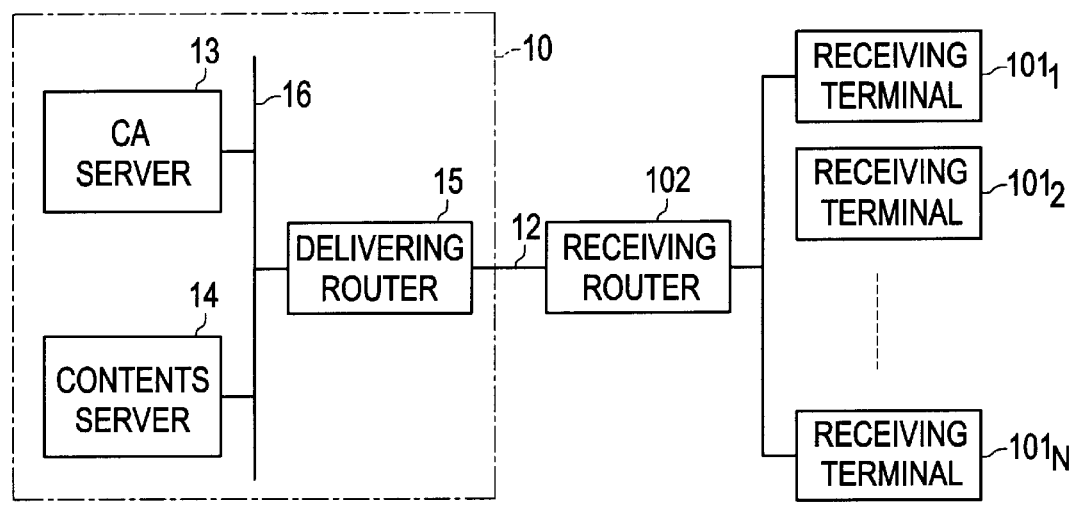
FIG. 16 shows a block diagram of a broadcasting system according to a second embodiment of the invention.

FIG. 16 shows a block diagram of the second embodiment of the invention, however, parts shown in FIG. 16 each of which is the same as the corresponding part shown in FIG. 1 have the same numeric symbols as the corresponding parts shown in FIG. 1, and description will be omitted about the same parts.

In the broadcasting system according to the second embodiment of the invention, the broadcasting unit 10 and receiving terminals $101_1$, $101_2$, ..., $101_N$ are connected via the receiving router 102. The receiving router 102 includes decoding function as similar to the receiving terminals in the first embodiment of the invention. Further, the receiving router 102 may also replace destination addresses of IP header parts.

Namely, contents which are translated to IP datagrams and delivered from the contents server 14 of the broadcasting unit 10 have a destination address which represents an IP address for the corresponding pay delivery service. The delivering router 15 selects IP datagrams which is directed to an address for pay delivery service and an address of the receiving terminal from various IP datagrams which are received from the LAN 16, and delivers the selected IP datagrams to the communication path 12. The receiving router 102 which receives the IP datagrams has the same decoding as the receiving terminal of the first embodiment, therefore, may decode the received IP datagrams using Kw and Ks which are delivered from a CA server 13. Then, the receiving router 102 may copies the IP datagrams for the number of the receiving terminals to be delivered by referring to IP addresses for delivering. Further, the receiving router 102 may replace destination addresses of the IP headers in the IP datagrams with an IP address of the receiving terminal which is to be delivered. Thereby, the receiving router 102 delivers the IP datagrams to a network of the receiving side, as a result, the IP datagrams are delivered to each receiving terminal. In this case, each of receiving terminals $101_1$–$101_N$ may receive service contents by receiving IP datagrams having an IP address of its own terminal.

FIGS. 17(a) through 17(c) show a flow of IP datagrams which are directed to the first receiving terminal $101_1$ or the second receiving terminal $101_2$ in the broadcasting system according to the second embodiment of the invention. FIG. 17(a) schematically shows a flow of IP datagrams on the LAN 16 in the broadcasting unit 10 shown in FIG. 1. As shown in FIG. 17(a), it is assumed that there are IP datagrams of the pay delivery service A $90_1$ and $90_4$, and IP datagram of the pay delivery service B $90_3$, and the other IP datagrams which are irrelevant to delivering of service contents $90_2$ and $90_8$. IP datagrams having an IP address for the delivery services or an IP address of each receiving terminal are stored at the delivering router 15 as shown in FIG. 11 from such IP datagrams on the LAN 16. Therefore, as shown in FIG. 17(b), the IP datagrams $90_2$ and $90_5$ are omitted, and IP diagrams $90_1$, $90_3$, and $90_4$ are delivered to the receiving router 102 via the communication path 12 and information to be delivered.

Since the first receiving terminal $101_1$ and the second receiving terminal $101_2$ enter into a contract of receiving of pay delivery services A and B as shown in the above descriptions (1) and (2), the IP datagram $90_1$ of the pay delivery service A, the IP datagram $90_3$ of the pay delivery service B, and the IP datagram $90_4$ of the pay delivery service A are each copied for the first receiving terminal $101_1$ and the second receiving terminal $101_2$. Consequently, IP datagrams $105_1$, $106_1$, and $107_1$ are supplied to the first receiving terminal $101_1$, and IP datagrams $105_2$, $106_2$, and $107_2$ are supplied to the second receiving terminal $101_2$. Here, IP datagrams which are supplied to the first receiving terminal and the second receiving terminal are focused, but the receiving router 102 practically copies the IP datagram of the pay delivery service A and delivers it to the third receiving terminal $101_3$, and copies the IP datagram of the pay delivery service B and delivers them to the forth receiving terminal $101_4$ and the fifth receiving terminal $101_5$.

Variations of the Invention

In the second embodiment of the invention, the receiving router 102 supplies IP datagrams to a plurality of receiving terminals by copying the IP datagram for the number of the receiving terminals. In this variation of the invention, however, IP datagrams are supplied to a network of receiving side by replacing destination addresses of IP header parts in the IP datagrams with a predetermined broadcast address at the network of receiving side. Thereby receiving terminals on the network of receiving side may receive service contents by only recognizing the broadcast address.

Further, in the broadcasting system according to the invention, the communication path does not limited to cable communication path and may include the other communication media such as radio communication path. Therefore, the broadcasting system according to the invention may desirably provide pay communication service such as satellite digital data broadcasting.

Also, the key generation unit 21 in the embodiments of the invention may generate encryption key such as Ks or Kw using a predetermined algorithm for example based on random number of the date and time. In the broadcasting system according to the invention, however, any other methods of generating the Ks or the Kw may be used.

In the embodiments of the invention, the CA server 13, the contents server 14, and the receiving terminals are explained as to serve to encrypt or decode using scramble key (Ks). However, if the encrypting or the decoding are not employed due to saving cost or improvement of processing speed, the broadcasting system according to the invention still may achieve the same efficiency as the above embodiments.

What is claimed is:

1. A broadcasting system which includes a source sending unit and a plurality of receiving terminals each of which is connected to the source sending unit via a network, said broadcasting system being operable to broadcast service contents from the source sending unit to the plurality of receiving terminals, the source sending unit comprising:

a data packet generator which generates a data packet including a part of the service contents and a group address assigned to a predetermined group of the receiving terminals as a destination address; and a service contents delivering unit which delivers the data packet to the predetermined group of the receiving terminals based on the group address;

wherein each of the receiving terminals of the predetermined group processes the part of the service contents sent directly to the receiving terminal by replacing the group address portion of the destination address with its own address after the receiving terminal receives the data packet.

2. The system claimed in claim 1 further comprising:

a router which passes through the only data packet which includes the group address destined to the predetermined group of the receiving terminals.

3. A broadcasting system which includes a source sending unit and a plurality of terminals each of which is connected to the source sending unit via a network, the broadcasting system broadcasting service contents from the source sending unit to the plurality of receiving terminals, the source sending unit comprising:

key supplying means which generates a work key for each service of the service contents and sends the work to the receiving terminals;

contents encrypting means which encrypts the service contents by using the work key; and contents delivering means which delivers the encrypted service contents to the receiving terminals, each of the receiving terminals comprising:

key receiving means which receives the work key from the source sending unit;

contents receiving means which receives the encrypted service contents from the source sending unit; and contents decoding means which decodes the received and encrypted service contents into decoded service contents;

wherein each of the receiving terminals of the predetermined group processes the part of the service contents sent directly to the receiving terminal by replacing the group address portion of the destination address with its own address after the receiving terminal receives the data packet.

4. The system claimed in claim 3, wherein the key supplying means further encrypts the work key for each receiving terminal by using master keys each of which is uniquely assigned to each of the receiving terminals and each of the key receiving means further decodes the work key by using the master key of the receiving terminal terminal.

5. The system claimed in claim 3, wherein the key supplying means further sends a scramble key to the receiving terminals;

the contents encrypting means further encrypting the service contents by using the scramble key;

each of the key receiving means further receiving the scramble key, and each of the contents decoding means further decoding the service contents by using the scramble key.

6. The system claimed in claim 5, wherein the scramble key is updated periodically and sent to the receiving.

7. A method of broadcasting service contents from a source sending unit to a plurality of receiving terminals each of which is connected to the source sending unit via a network, the method comprising the steps of:

preparing the source sending unit, generating a data packet including a part of the service contents and a group address assigned to a predetermined group of the receiving terminals as a destination address; and broadcasting the data packet to the predetermined group of the receiving terminals on the basis of the group address;

wherein each of the receiving terminals of the predetermined group processes the part of the service contents sent directly to the receiving terminal by replacing the group address portion of the destination address with its own address after the receiving terminal receives the data packet.

8. A method of broadcasting service contents from a source sending unit to a plurality of receiving terminals each of which is connected to the source sending unit via a network, the method comprising the steps of:

preparing the source sending unit, generating a work key for each service of the service contents and sending the work key to the receiving terminals;

encrypting the service contents by using the working key; and delivering the encrypted service contents to the receiving terminals;

at each of the receiving terminals, receiving the work key from the source sending unit;

receiving the encrypted service contents from the source sending unit; and decoding the received and encrypted service contents;

wherein each of the receiving terminals of the predetermined group processes the part of the service contents sent directly to the receiving terminal by replacing the group address portion of the destination address with its own address after the receiving terminal receives the data packet.

9. The method as claimed in claim 8 further comprising the steps of:

encrypting the work key for each receiving terminal by using master keys each of which is uniquely assigned to each of the receiving terminals before the work key is sent to the receiving terminals from the source sending unit; and decoding the work key by using the master key of the receiving terminal at each of the receiving terminals.

10. The method claimed in claim 8 further comprising the steps of:

sending a scramble key from the source sending unit to the receiving terminals before each of the receiving terminal uses the scramble key;

encrypting the service contents by using the scramble key before the service contents are sent to the receiving terminal from the source sending unit;

receiving the scramble key after the scramble key is sent from the source sending unit at each of the receiving terminals; and decoding the service contents by using the scramble key at each of the receiving terminals.

11. The method as claimed in claim 10, wherein the scramble key is updated periodically and sent to the receiving terminals.

12. A computer readable medium which stores a program operable for broadcasting service contents from a source sending unit to a plurality of receiving terminals each of which is connected to the source sending unit via a network, the program comprising, at the source sending unit, the steps of:

generating a data packet including a part of the service contents and a group address which represents a predetermined group of the receiving terminals as a destination address; and broadcasting the data packet to the predetermined group of the receiving terminals based on the group address;

wherein each of the receiving terminals of the predetermined group processes the part of the service contents sent directly to the receiving terminal by replacing the group address portion of the destination address with its own address after the receiving terminal receives the data packet.

13. A computer readable medium which stores a program operable for broadcasting service contents from a source sending unit to a plurality of receiving terminals each of which is connected to the source sending unit via network, the program being used in the sources sending unit and comprising the steps of:

generating a work key for each service of the service contents and sending the work key to the receiving terminals;

encrypting the service contents using the work key; and delivering the encrypted service contents to the receiving terminals;

the program being used in each of the receiving terminals and comprising the steps of:

receiving the work key from the source sending unit;

receiving the encrypted service contents from the source sending unit; and decoding the received and encrypted service contents wherein each of the receiving terminals of the predetermined group processes the part of the service contents sent directly to the receiving terminals by replacing the group address portion of the destination address with its own address after the receiving terminal receives the data packet.

* * * * *